United States Patent
Chun et al.

(10) Patent No.: US 7,721,038 B2
(45) Date of Patent: May 18, 2010

(54) SYSTEM ON CHIP (SOC) SYSTEM FOR A MULTIMEDIA SYSTEM ENABLING HIGH-SPEED TRANSFER OF MULTIMEDIA DATA AND FAST CONTROL OF PERIPHERAL DEVICES

(75) Inventors: Ik Jae Chun, Daejeon (KR); Tae Moon Roh, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 12/171,397

(22) Filed: Jul. 11, 2008

(65) Prior Publication Data

US 2009/0138645 A1  May 28, 2009

(30) Foreign Application Priority Data

Nov. 27, 2007  (KR) ............... 10-2007-0121656

(51) Int. Cl.
 G06F 13/36  (2006.01)
 G06F 13/00  (2006.01)
 G06F 13/28  (2006.01)
(52) U.S. Cl. .................. 710/306; 710/22; 710/27; 710/300; 710/308; 710/312; 714/9
(58) Field of Classification Search .............. 710/22, 710/27, 306, 308, 312
 See application file for complete search history.

(56) References Cited

U.S. PATENT DOCUMENTS 5,392,252 A * 2/1995 Rimpo et al. .......... 365/230.02
5,983,325 A * 11/1999 Lewchuk ................ 711/137
6,898,646 B1 * 5/2005 Bonola et al. .......... 710/22
7,441,054 B2 * 10/2008 Wu et al. ............... 710/22

(Continued)

FOREIGN PATENT DOCUMENTS

KR  1020050066938 A  6/2005

(Continued)

OTHER PUBLICATIONS

"TMS320DM6446 Digital Media System-on-Chip", Texas Instruments Incorporated, SPRS283E—Dec. 2005—Revised Mar. 2007.

*Primary Examiner*—Mark Rinehart
*Assistant Examiner*—Brian T Misiura
(74) *Attorney, Agent, or Firm*—Ladas & Parry LLP

(57) ABSTRACT

Provided is a System on Chip (SoC) system for a multimedia system enabling high-speed transfer of a large amount of multimedia data and a processor to rapidly control a peripheral device. The SoC system includes a processor; a plurality of peripheral devices; a plurality of physically divided memories; a control bus for transferring a control signal from the processor to the peripheral devices and the memories; a data bus for transferring data between the processor, the peripheral devices and the memories; a bridge for coupling the control bus and the data bus to the processor; a plurality of memory controllers coupled to the control bus and controlling each of the memories; a Direct Memory Access (DMA) controller coupled to the data bus and the control bus and controlling data transfer between the peripheral devices and the memories; and a matrix switch coupled between the DMA controller and the memory controllers and enabling simultaneous multiple memory access.

18 Claims, 2 Drawing Sheets

U.S. PATENT DOCUMENTS

| | | | |
|---|---|---|---|
| 7,475,182 B2 * | 1/2009 | Matsuse et al. | 710/308 |
| 2006/0200606 A1 * | 9/2006 | Kang et al. | 710/110 |
| 2007/0162645 A1 * | 7/2007 | Han et al. | 710/22 |
| 2007/0208887 A1 * | 9/2007 | Kim et al. | 710/22 |
| 2008/0082621 A1 * | 4/2008 | Han et al. | 709/211 |

FOREIGN PATENT DOCUMENTS

| | | |
|---|---|---|
| KR | 1020070059859 A | 6/2007 |

* cited by examiner

SYSTEM ON CHIP (SOC) SYSTEM FOR A MULTIMEDIA SYSTEM ENABLING HIGH-SPEED TRANSFER OF MULTIMEDIA DATA AND FAST CONTROL OF PERIPHERAL DEVICES

CROSS-REFERENCE TO RELATED APPLICATION

This application claims priority to and the benefit of Korean Patent Application No. 2007-121656, filed Nov. 27, 2007, the disclosure of which is incorporated herein by reference in its entirety.

BACKGROUND

1. Field of the Invention

The present invention relates to a System on Chip (SoC) system, and more particularly, to an SoC system for a multimedia system enabling high-speed transfer of a large amount of multimedia data and fast control of peripheral devices by a processor.

The present invention is derived from the research supported by the IT R&D program of the Ministry of Information and Communication (Republic of Korea) and the Institute for Information Technology Advancement (Republic of Korea) [Project Management Number: 2006-S006-02, Project Title: Component/Module technology for Ubiquitous Terminals].

2. Discussion of Related Art

A conventional bus-based SoC communication architecture is simple and requires a low design cost. In this architecture, a master device occupying the bus can directly and rapidly transfer data with peripheral devices. However, the conventional SoC communication architecture can transfer data only through a single bus shared by several devices and thus can transfer only one piece of data at a time. In addition, the greater the number of masters, i.e., transmitters, the lower a bus occupation ratio of each master is. Such a reduction in the occupation ratio limits the transfer quantity of a master and thus is not appropriate for a multiprocessor-based system that must transfer a large amount of data between masters in a short time.

In particular, in the SoC architecture based on data transfer using a shared memory, a master cannot access the memory while another master is using the memory. AMBA 2.0 on-chip bus is an example of such a SoC architecture. According to AMBA 2.0 on-chip bus, when one master Intellectual Property (IP) module is occupying a physical bus, other master IP modules cannot perform communication. Therefore, such architecture does not solve a problem of a bandwidth constraint caused by sharing a physical wire when data is transferred between a master IP module and a slave IP module.

In order to solve the above problem, there is a method that applies characteristics of a network to chip design. An on-chip network device designed according to an on-chip network protocol includes a plurality of on-chip network interfaces and a switch. The on-chip network interface includes an up-sampler for sequentially transferring on-chip network signals input from an IP module supporting the on-chip network protocol to the switch, and a down-sampler for transferring in reverse order on-chip network signals input from the switch to the IP module.

The on-chip network architecture is intended to solve the problem that, when one master IP module has a bus grant, other master IP modules must wait to use the bus. In this architecture, when many master IP modules need to simultaneously use a bus to communicate with different slave IP modules, the master IP modules can simultaneously perform communication without waiting for a bus grant. Such architecture is intended to prevent an IP module from waiting to use a bus and smoothly transfer a large amount of data.

However, the architecture is complex, requires a high design cost, and is not appropriate for controlling a device requiring a short delay because of data transfer delay between a switch and a network interface.

SUMMARY OF THE INVENTION

The present invention is directed to providing a System on Chip (SoC) system that efficiently combines a bus architecture capable of processing requests of processors to transfer a large amount of data in a short time with a network architecture capable of simultaneously processing data transfer requests of various devices, and thus is appropriate for processing a large amount of data at high speed.

The present invention is also directed to providing a SoC system that has a control path of peripheral devices and a data transfer path separated from each other, uses a memory structure physically divided according to data characteristics and data communication bandwidth requirement, allowing for a large amount of data transferred at high speed.

One aspect of the present invention provides a SoC system, including: a processor; a plurality of peripheral devices; a plurality of physically divided memories; a control bus for transferring a control signal from the processor to the peripheral devices and the memories; a data bus for transferring data between the processor, the peripheral devices and the memories; a bridge for coupling the control bus and the data bus to the processor; a plurality of memory controllers coupled to the control bus and controlling each of the memories; a Direct Memory Access (DMA) controller coupled to the data bus and the control bus and controlling data transfer between the peripheral devices and the memories; and a matrix switch coupled between the DMA controller and the memory controllers and enabling simultaneous multiple memory access.

The memories may be divided on the basis of at least one of a data characteristic and communication bandwidth requirement.

The bridge may allow the processor to separately access the control bus and the data bus.

The SoC system may further include an additional bridge for extending the control bus and at least one of additional peripheral devices and additional operation units is coupled to and controlled by the control bus extended through the additional bridge.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
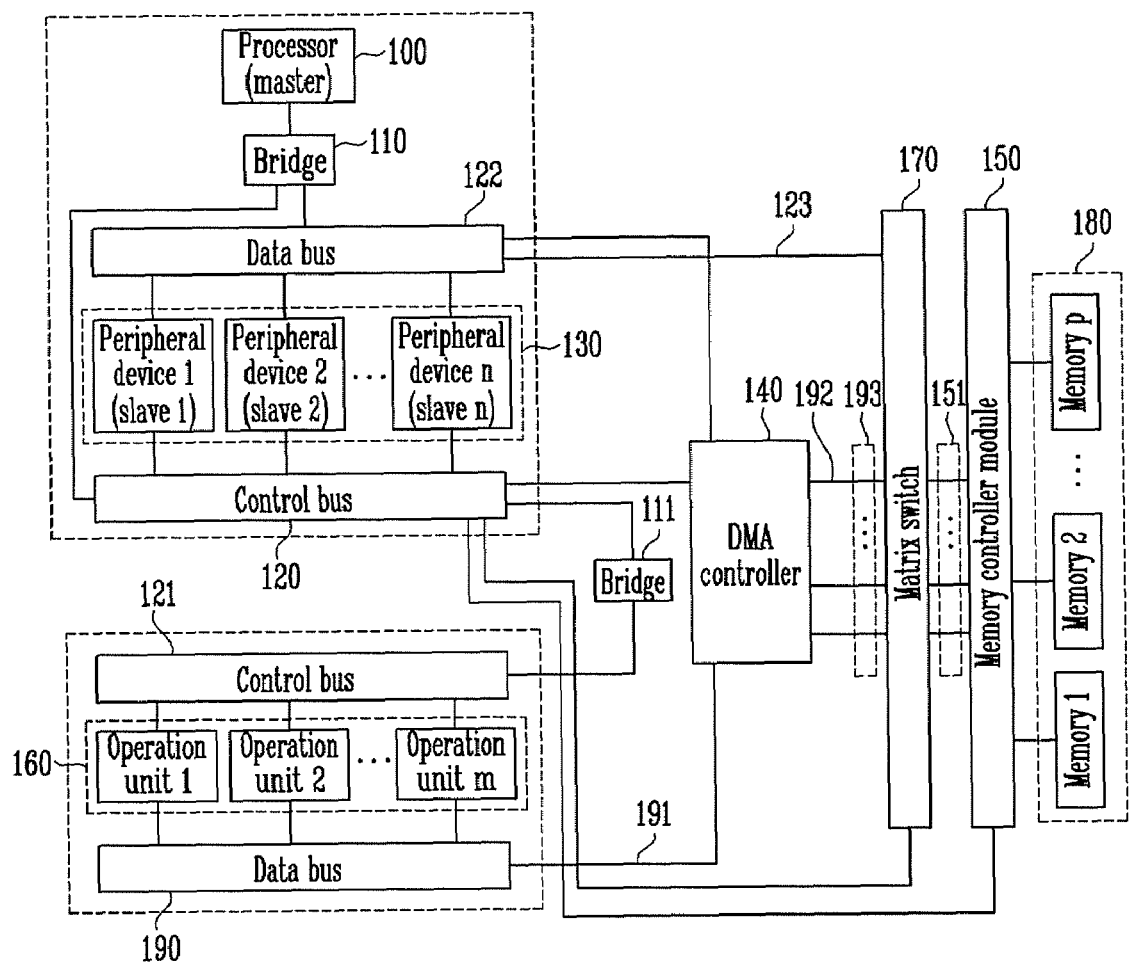
FIG. 1 is a block diagram of a System on Chip (SoC) according to a first exemplary embodiment of the present invention.
Figure 2:
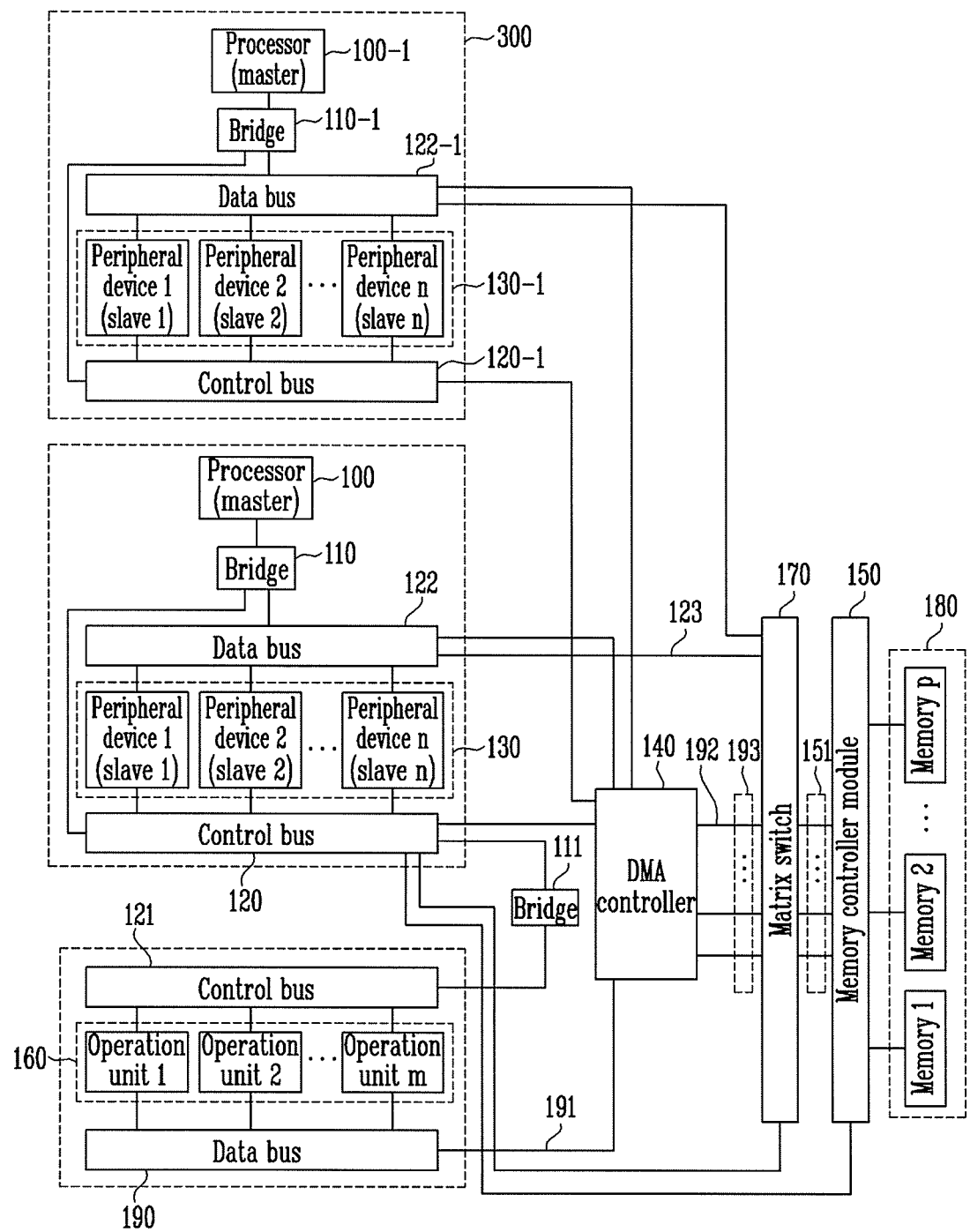
FIG. 2 is a block diagram of a SoC according to a second exemplary embodiment of the present invention.

FIG. 1 is a block diagram of a System on Chip (SoC) architecture according to a first exemplary embodiment of the present invention, and FIG. 2 is a block diagram of a SoC architecture according to a second exemplary embodiment of the present invention. The SoC architecture shown in FIG. 2 is different from the SoC architecture shown in FIG. 1 in that it further includes a subsystem 300 connected through a bridge 111 and having an additional processor for system expansion. Other components are the same as those of the SoC architecture of FIG. 1 and thus denoted by the same reference numerals throughout the drawings.

Referring to FIG. 1, the SoC system according to the first exemplary embodiment of the present invention includes a processor 100; a peripheral device module 130 having a plurality of peripheral devices; a memory module 180 having a plurality of physically divided memories; a control bus 120 for transferring a control signal from the processor 100 to the peripheral device module 130 and the memory module 180; a data bus 122 for exchanging data between the processor 100, the peripheral device module 130 and the memory module 180; a bridge 110 for coupling the control bus 120 and the data bus 122 to the processor 100; a memory controller module 150 coupled to the control bus 120 and having a plurality of memory controllers for controlling the respective memories in the memory module 180; a Direct Memory Access (DMA) controller 140 coupled to the data bus 122 and the control bus 120 and controlling data transfer between the peripheral devices and the memories; and a matrix switch 170 coupled between the DMA controller 140 and the memory controller module 150 and enabling simultaneous multiple memory access.

The processor 100 can separately perform controlling the peripheral devices and transferring data using the control bus 120 and the data bus 122 coupled through the bridge 110. The bridge 110 allows the processor 100 to separately access the control bus 120 and the data bus 122.

Through the control bus 120 coupled to the bridge 110, the processor 100 accesses and changes registers of the peripheral devices, the DMA controller 140, the matrix switch 170 and the memory controller module 150, thereby controlling operation and states of them.

According to an exemplary embodiment, the control bus 120 can be extended through the additional bridge 111. Through an extended control bus 121, an operation unit module 160, such as a Digital Signal Processor (DSP) and a reconfigurable processor, may be connected to and controlled by the processor 100. The operation units perform data transfer through an additional data bus 190 connected to the DMA controller 140.

In the above exemplary embodiment, the control buses 120 and 121 and the data buses 122 and 190 are based on Advanced Microcontroller Bus Architecture (AMBA), among various bus architectures. However, AMBA is used only as an example, and other bus architectures can also be used. More specifically, the bus systems 120, 122, 121 and 190 include an arbiter granting one of a plurality of masters to use a bus, and a decoder decoding an address obtained from the master to select a slave allocated to the master. Detailed descriptions on the bus systems are found in the AMBA standard and other bus standards and thus will be omitted.

The peripheral device in the peripheral device module 130 includes a control interface for connecting to the control bus 120 to control operation and a state, and a data transfer interface for connecting to the data bus 122 to transfer data. In an exemplary embodiment, when the control bus 120 and the data bus 122 are accessible through one interface, device control and data transfer can be performed by accessing the data bus 122. The peripheral device module 130 may include a memory for the processor 100 to execute a program.

In comparison with a system using a hardwired multimedia codec Intellectual Property (IP), a system for processing a large amount of multimedia data using processor-based operation units, such as a reconfigurable processor, should be able to transfer a large amount of data through a memory at higher speed. To this end, the present invention implements data communication architecture based on the DMA controller 140, the matrix switch 170 and the memories divided according to data transfer characteristics.

The DMA controller 140 provides a plurality of channels, which operate in a separate manner, and each channel provides a dual port master interface, which is required for high-speed data transfer between the data buses 122 and 190 and the matrix switch 170. Operation of the each channel of the DMA controller 140 may be controlled by a processor requiring DMA control.

In an exemplary embodiment, the DMA controller 140 may increase the number of DMA channels and allocate different DMA channels for transferring data to the respective operation units, which require high-speed transfer of a large amount of data.

The matrix switch 170 is connected between the DMA controller 140 and the memory controller module 150, and allows several processors and master modules to simultaneously transfer data to the memories. This is enabled by a switch structure. By using the matrix switch 170 that can receive data and then transfer them to a destination, a plurality of modules can simultaneously use the network. In other words, while one module is using the network, other modules do not need to send a request for network use and wait.

In an exemplary embodiment, the matrix switch 170 has a plurality of input ports connected with the data buses 122 and 190 and the DMA controller 140 for receiving data, a plurality of output ports connected with the respective memory controllers for outputting data to one of the memories in the memory module 180, and an arbiter for selecting an output port to output data, which is input through one of the input ports.

When several pieces of data having several destinations are input through the input ports, the addresses of the data are decoded, and output port request signals are transferred to the arbiter. When the corresponding output port is not used, the arbiter admits the request signal and transfers the data at the input ports to the output port. Thus, it is possible to simultaneously transfer as many pieces of data as the number of output ports to destinations. The matrix switch 170 must provide an input port connection 123 to the data bus 122, an input port connection 193 to the DMA controller 140, and as many output port connections 151 as the number of the physically divided memories.

The memory controller module 150 includes the memory controllers controlling the physically divided respective memories, and may control them through the control bus 120.

The memory module 180 includes the physically divided memories, and the respective memories are the same as separate slaves connected to the output ports of the matrix switch 170. Here, the memories are physically divided in consideration of a data characteristic and/or a communication bandwidth requirement, thereby reducing traffic caused by sharing one memory.

In brief, a data transfer operation performed by the above described system is as follows. The processor 100 obtains data from the peripheral devices connected to the data bus 122 through the bridge 110, and transfers data to the memory controller module 150 through the data bus 122 and the matrix switch 170. The memory controller module 150 transfers data between the matrix switch 170 and the memory module 180.

The DMA controller 140 reads data from the peripheral devices through the data bus 122 and transfers the data to the matrix switch 170 through a DMA port connected to the matrix switch 170. The matrix switch 170 decodes the destination address of the received data and transfers the data to the memory controller module 150 through the corresponding port. The memory controller module 150 transfers the data to a designated memory of the memory module 180.

For an effective process of multimedia data, the operation unit module 160 stores data in a memory of the memory module 180, through the data bus 190, the DMA channels 191 and 192, the matrix switch 170 and the memory controller module 150.

FIG. 2 is a block diagram of a SoC according to a second exemplary embodiment of the present invention. The second exemplary embodiment is implemented by adding the subsystem 300 having an additional processor 100-1 to the first exemplary embodiment. As illustrated, a control bus 120-1 and a data bus 122-1 of the subsystem 300 are connected to a DMA controller 140 and a matrix switch 170. The SoC system according to an exemplary embodiment of the present invention can be extended by adding the subsystem 300. Here, respective subsystems are separate from each other, and a shared memory is prepared in a memory module 180 such that data and messages can be transferred between the two subsystems.

As described above, the present invention separates a control path for controlling peripheral devices of a processor from a memory access path using a data bus and DMA such that the processor can rapidly control the peripheral devices, and a large amount of data can be transferred at high speed. In addition, memories are accessed through a matrix switch, and thus it is possible to simultaneously access different memories and distribute traffic of the memories. Therefore, a large amount of data can be transferred in a short time.

The SoC architecture according to an exemplary embodiment of the present invention allows operation units and peripheral devices to transfer a large amount of data at high speed. In addition, the SoC architecture can efficiently control the system without affecting data transfer by efficiently combining the switch structure and the bus architecture.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A System on Chip (SoC) system, comprising:
a processor;
a plurality of peripheral devices;
a plurality of physically divided memories;
a control bus for transferring a control signal from the processor to the peripheral devices and the memories;
a data bus for transferring data between the processor, the peripheral devices and the memories;
a bridge for coupling the control bus and the data bus to the processor;
a plurality of memory controllers coupled to the control bus and controlling each of the memories;
a Direct Memory Access (DMA) controller coupled to the data bus and the control bus and controlling data transfer between the peripheral devices and the memories;
a matrix switch coupled between the DMA controller and the memory controllers and enabling simultaneous multiple memory access; and
an additional bridge for extending the control bus, wherein at least one of additional peripheral devices and operation units is coupled to and controlled by the control bus extended through the additional bridge.

2. The SoC system of claim 1, wherein the memories are divided on the basis of at least one of a data characteristic and communication bandwidth requirement.

3. The SoC system of claim 1, wherein the bridge allows the processor to separately access the control bus and the data bus.

4. The SoC system of claim 1, wherein the operation units comprises at least one of a digital signal processor (DSP) and a reconfigurable processor.

5. The SoC system of claim 1, wherein each of the peripheral devices includes a control interface coupled to the control bus, and a data transfer interface coupled to the data bus.

6. The SoC system of claim 1, wherein the DMA controller has a plurality of separately operating DMA channels, and each of the DMA channels is controlled by the processor requiring DMA control.

7. The SoC system of claim 1, wherein the matrix switch includes:
a plurality of input ports connected with data-bus and the DMA controller to receive data;
a plurality of output ports-connected with each of the memory controllers to output the data to the physically divided memories; and
an arbiter for selecting an output port to output the data input through one of the input ports.

8. The SoC system of claim 1, further comprising:
a subsystem having an additional processor and a plurality of additional peripheral devices connected to the additional processor through a subsystem data bus and a subsystem control bus,
wherein the DMA controller and the matrix switch are connected to the subsystem data bus and the subsystem control bus.

9. The SoC system of claim 8, wherein a shared memory is designated from among the memories for the purpose of data communication with the subsystem.

10. A System on Chip (SoC) system, comprising:
a processor;
a plurality of peripheral devices;
a plurality of physically divided memories;
a control bus for transferring a control signal from the processor to the peripheral devices and the memories;
a data bus for transferring data between the processor, the peripheral devices and the memories;
a bridge for coupling the control bus and the data bus to the processor;
a plurality of memory controllers coupled to the control bus and controlling each of the memories;
a Direct Memory Access (DMA) controller coupled to the data bus and the control bus and controlling data transfer between the peripheral devices and the memories; and
a matrix switch coupled between the DMA controller and the memory controllers and enabling simultaneous multiple memory access, wherein a subsystem having an; additional processor and a plurality of additional peripheral devices connected to the additional processor through a subsystem data bus and a subsystem control bus, wherein the DMA controller and the matrix switch are connected to the subsystem data bus and the subsystem control bus.

11. The SoC system of claim 10, wherein the memories are divided on the basis of at least one of a data characteristic and communication bandwidth requirement.

12. The SoC system of claim 10, wherein the bridge allows the processor to separately access the control bus and the data bus.

13. The SoC system of claim 10, an additional bridge for extending the control bus, wherein at least one of additional peripheral devices and operation units is coupled to and controlled by the control bus extended through the additional bridge.

14. The SoC system of claim 13, wherein the operation units comprises at least one of a digital signal processor (DSP) and a reconfigurable processor.

15. The SoC system of claim 10, wherein each of the peripheral devices includes a control interface coupled to the control bus, and a data transfer interface coupled to the data bus.

16. The SoC system of claim 10, wherein the DMA controller has a plurality of separately operating DMA channels, and each of the DMA channels is controlled by the processor requiring DMA control.

17. The SoC system of claim 10, wherein the matrix switch includes:
    a plurality of input ports connected with the data bus and the DMA controller to receive data;
    a plurality of output ports connected with each of the memory controllers to output the data to the physically divided memories; and
    an arbiter for selecting an output port to output the data input through one of the input ports.

18. The SoC system of claim 10, wherein a shared memory is designated from among the memories for the purpose of data communication with the subsystem.

* * * * *